United States Patent [19]

Siladke et al.

[11] Patent Number: 5,632,065
[45] Date of Patent: May 27, 1997

[54] EXTENDED CAB PICKUP TRUCK CONCEALED CARGO DOOR HINGE HAVING A SPRING STOP DETENT

[75] Inventors: E. Robert Siladke, Sterling Heights; Kevin D. Lapham, Royal Oak, both of Mich.

[73] Assignee: General Motors Corporation, Detroit, Mich.

[21] Appl. No.: 603,756

[22] Filed: Feb. 20, 1996

Related U.S. Application Data

[63] Continuation-in-part of Ser. No. 279,142, Jul. 22, 1994, Pat. No. 5,491,875.

[51] Int. Cl.⁶ ......................................................... E05D 3/08
[52] U.S. Cl. ................................................. 16/335; 16/368
[58] Field of Search ............................... 16/333–336, 323, 16/346, 347, 368

[56] References Cited

U.S. PATENT DOCUMENTS

| | | |
|---|---|---|
| 575,961 | 1/1897 | Kipp . |
| 1,578,570 | 3/1926 | Anderson . |
| 2,008,256 | 7/1935 | Lefevre ........................ 16/164 |
| 2,039,130 | 4/1936 | Van Note ..................... 16/164 |
| 2,893,050 | 7/1959 | McFerrell .................... 16/335 |
| 3,605,173 | 9/1971 | Lautenschlager, Jr. ...... 16/163 |
| 3,968,540 | 7/1976 | Lautenschlager et al. .... 16/163 |
| 4,502,182 | 3/1985 | Lautenschlager et al. .... 16/288 |
| 4,771,508 | 9/1988 | Lautenschlager, Jr. ...... 16/370 |
| 4,873,743 | 10/1989 | Toyama ....................... 16/237 |
| 4,884,316 | 12/1989 | Masuda ....................... 16/288 |
| 4,894,884 | 1/1990 | Lautenschlager, Jr. ...... 16/278 |

FOREIGN PATENT DOCUMENTS

| | | |
|---|---|---|
| 665449 | 9/1938 | Germany . |
| 1186935 | 4/1970 | United Kingdom ............ 16/335 |

*Primary Examiner*—M. Rachuba
*Assistant Examiner*—Kenneth J. Hansen
*Attorney, Agent, or Firm*—Ernest E. Helms

[57] ABSTRACT

A spring stop is provided for a vehicle door hinge arrangement having primary and secondary leaves with a base, an arm extending from the base, and a hand extending from the arm to receive a pin. The primary and secondary leaves are connected with a reinforcement leaf. The hand of the primary leaf receives a pin that is connected to a member of the door hinge arrangement.

6 Claims, 5 Drawing Sheets

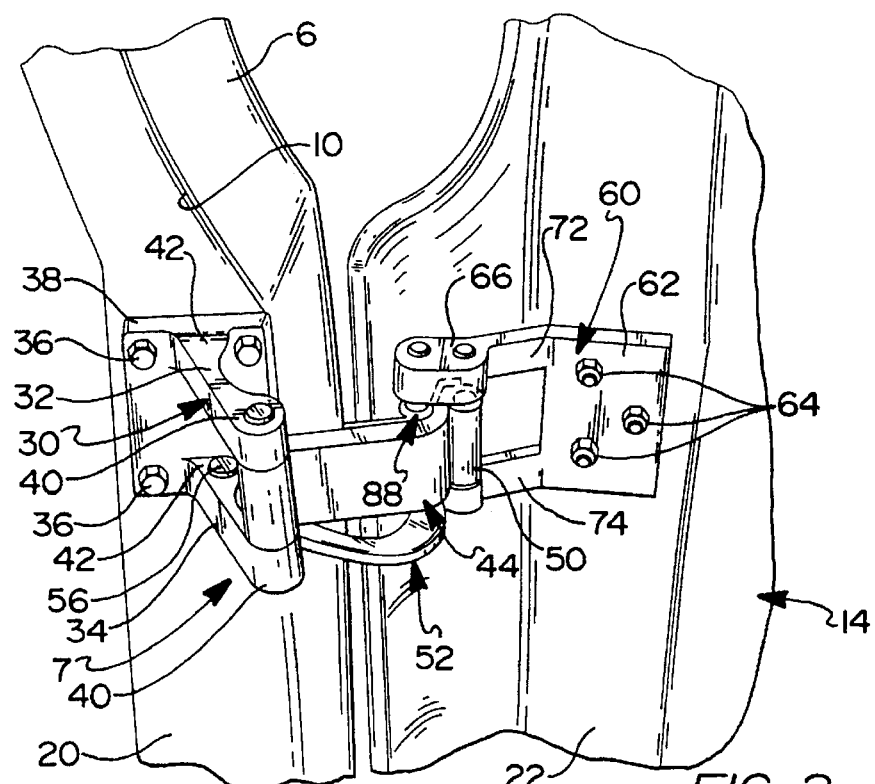
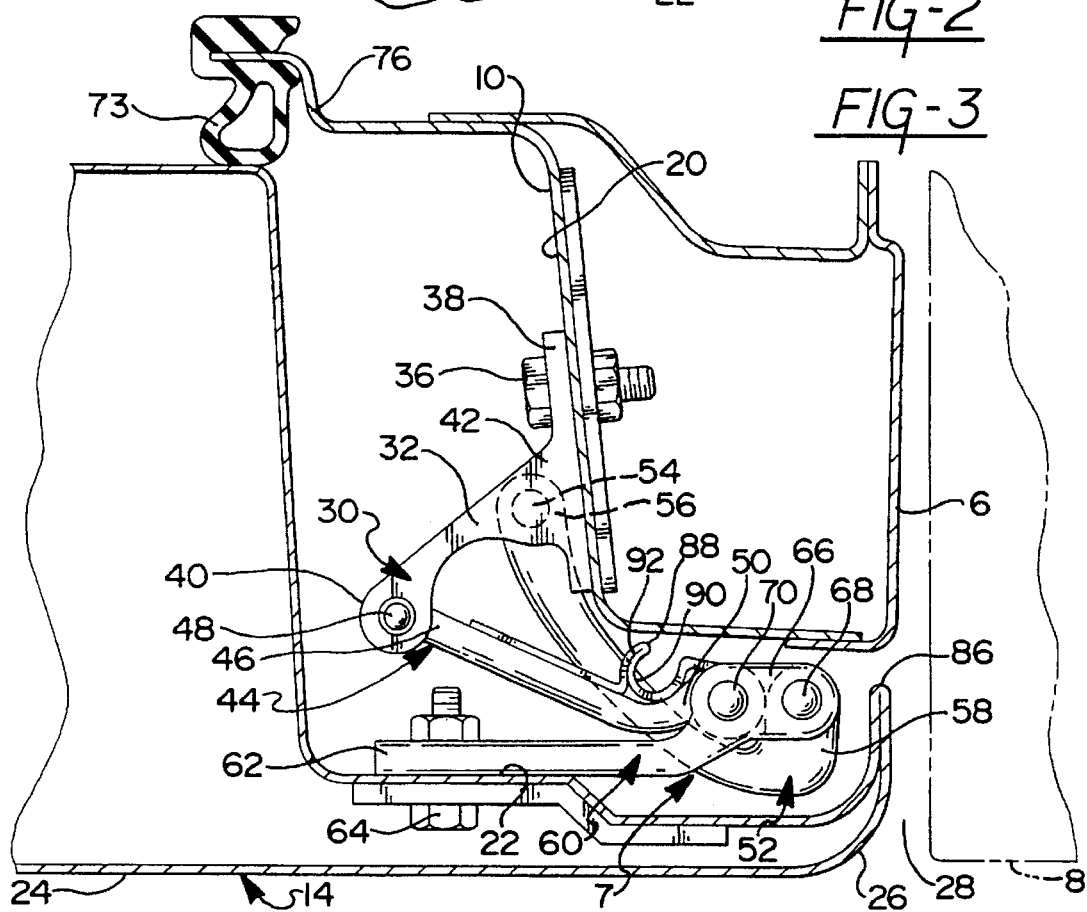
FIG-2
FIG-3

5,632,065

EXTENDED CAB PICKUP TRUCK CONCEALED CARGO DOOR HINGE HAVING A SPRING STOP DETENT

This application is a continuation-in-part of Ser. No. 08/279,142, filed Jul. 22, 1994 which issued as U.S. Pat. No. 5,491,875 Feb. 20, 1996 to Siladke et al.

FIELD OF THE INVENTION

The field of the present invention is that of automotive door hinge arrangement with spring stops to hold an automotive door in an open position.

BACKGROUND OF THE INVENTION

It is well known in the automotive industry to have a pickup truck with an extended cab. An extended cab in a pickup truck allows for the placement of a small bench seat for children or for storage inside the truck. The overwhelming majority of extended cab trucks have only driver side and passenger side vehicle doors. In smaller pickup trucks, an area behind the seating is provided for cargo space. A rear cargo door, at least on the driver side, is highly desirable to give greater ease of access to the cargo space. It is desirable that when the cargo door is open, it have a detented position which will prevent inadvertent closure.

SUMMARY OF THE INVENTION

The present invention provides a hinge arrangement having a detented position which prevents inadvertent closure which, in a preferred embodiment, requires less force to place in the detented position than to close from a detented open position and which provides a high level of reliability.

Other advantages of the present invention will be more apparent as the present invention is explained further in the accompanying drawings and detailed description.

BRIEF DESCRIPTION OF THE DRAWINGS

FIG. 2 is an enlarged perspective view of the top hinge shown in FIG. 1.

FIGS. 3 and 4 are plane elevational views of the hinge shown in FIG. 2 with FIG. 3 showing the hinge with the door in the closed position and FIG. 4 showing the door in its fully open position.

FIG. 5 is a projection of the trajectory of portions of the door and the hinge shown in FIGS. 1 through 4 while opening the door.

DESCRIPTION OF THE PREFERRED EMBODIMENT

Figure 1:
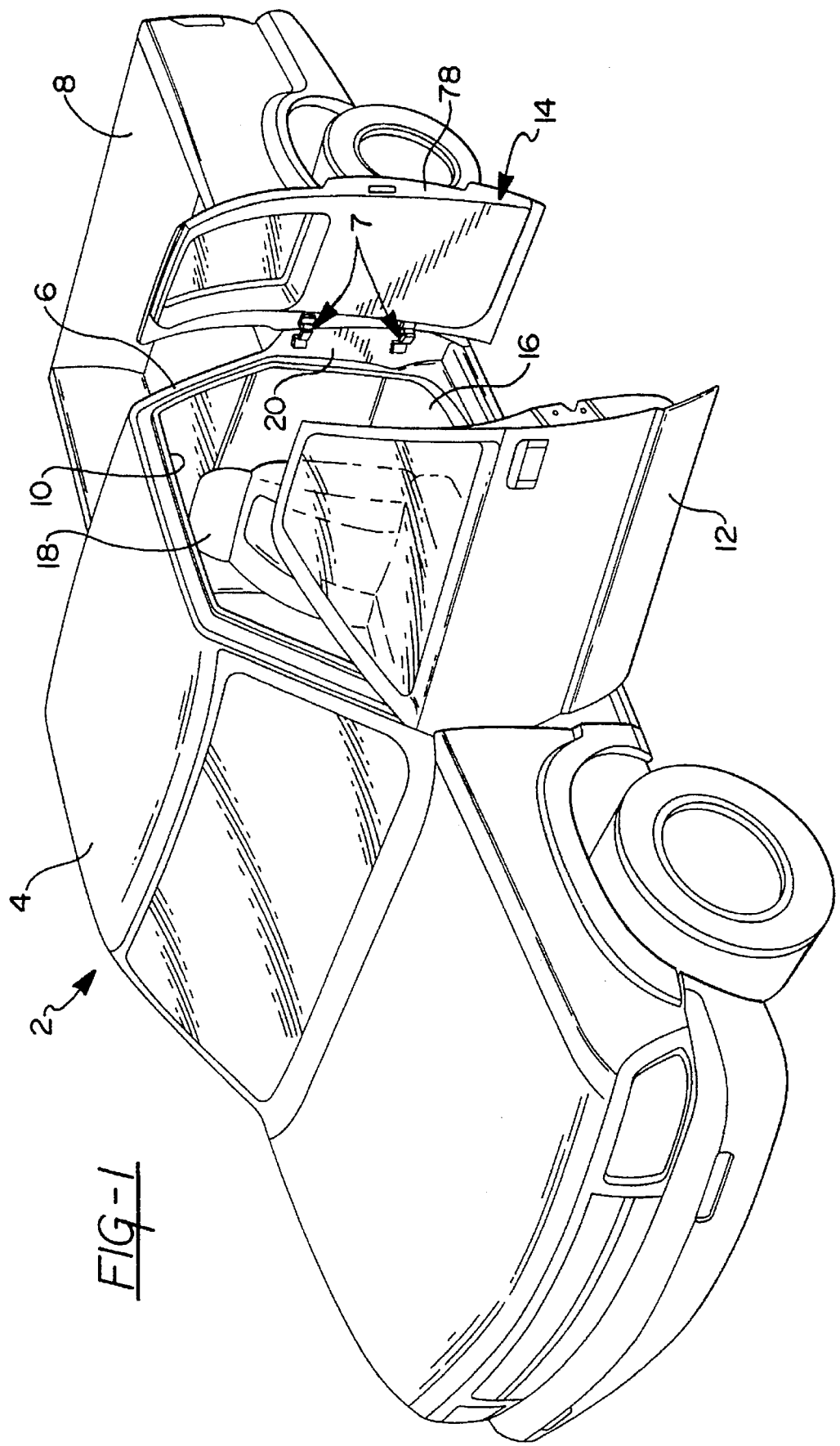
FIG. 1 is a perspective view of an extended cab pickup truck with a rear cargo door utilizing a hinge prior to an embodiment of the present invention.

Referring to FIGS. 1 through 4, an extended cab pickup truck 2 of the present invention has a cab body 4 with a B-pillar 6 and a truck bed 8. The cab has a side opening 10 which is enclosed by a from passenger door 12 and a rear cargo door 14. Connecting the rear cargo door 14 with the B-pillar 6 is an upper and lower hinge 7. The opening of door 14 allows access to the cargo space 16 behind the vehicle seat 18. The B-pillar 6 has a first planar surface 20 almost perpendicular to the fore and aft direction of the vehicle. The door 14 has a second planar surface 22. The door 14 has an outer panel 24 terminating in a bend 26 which has a slight gap 28 between itself and the truck bed 8.

The hinge 7 has a first link 30. The first link 30 has an upper member 32 and a lower member 34 parallel spaced therefrom. First link upper and lower members 32 and 34 are joined to a base 38. By a series of bolts 36, the base 38 is joined to the first planar surface 20 of the B-pillar 6. The first link upper and lower members 32, 34 also have generally extreme first ends 40 and second ends 42 more adjacent to the base 38. Each first link first end 40 and the second end 42 are on the same side of the base 38, allowing the base 38 to be strong and uninterrupted. The first link 30 is a weight-supporting link.

A second link 44 has a first end 46 pivotally connected to the first end 40 of the first link by a pin 48. The second link 44 also has a second end 50.

A third link 52 has a first end 54 pivotally connected to the second end 42 of the first link by a pin 56. The third link 52 also has a second end 58.

A fourth link 60 is connected to the door 14. The fourth link 60 has a first end 62 connected by bolts 64 to the second planar surface 22 of the door. The second end 66 of the fourth link is pivotally connected by a pin 68 to the second end 58 of the third link. Intermediate the fourth link first end 62 and the fourth link second end 66, the fourth link 60 is pivotally connected by a pin 70 to the second end 50 of the second link. The fourth link 60 is weight bearing and has an upper member 72 and a lower parallel-spaced member 74.

Figures 4, 5:
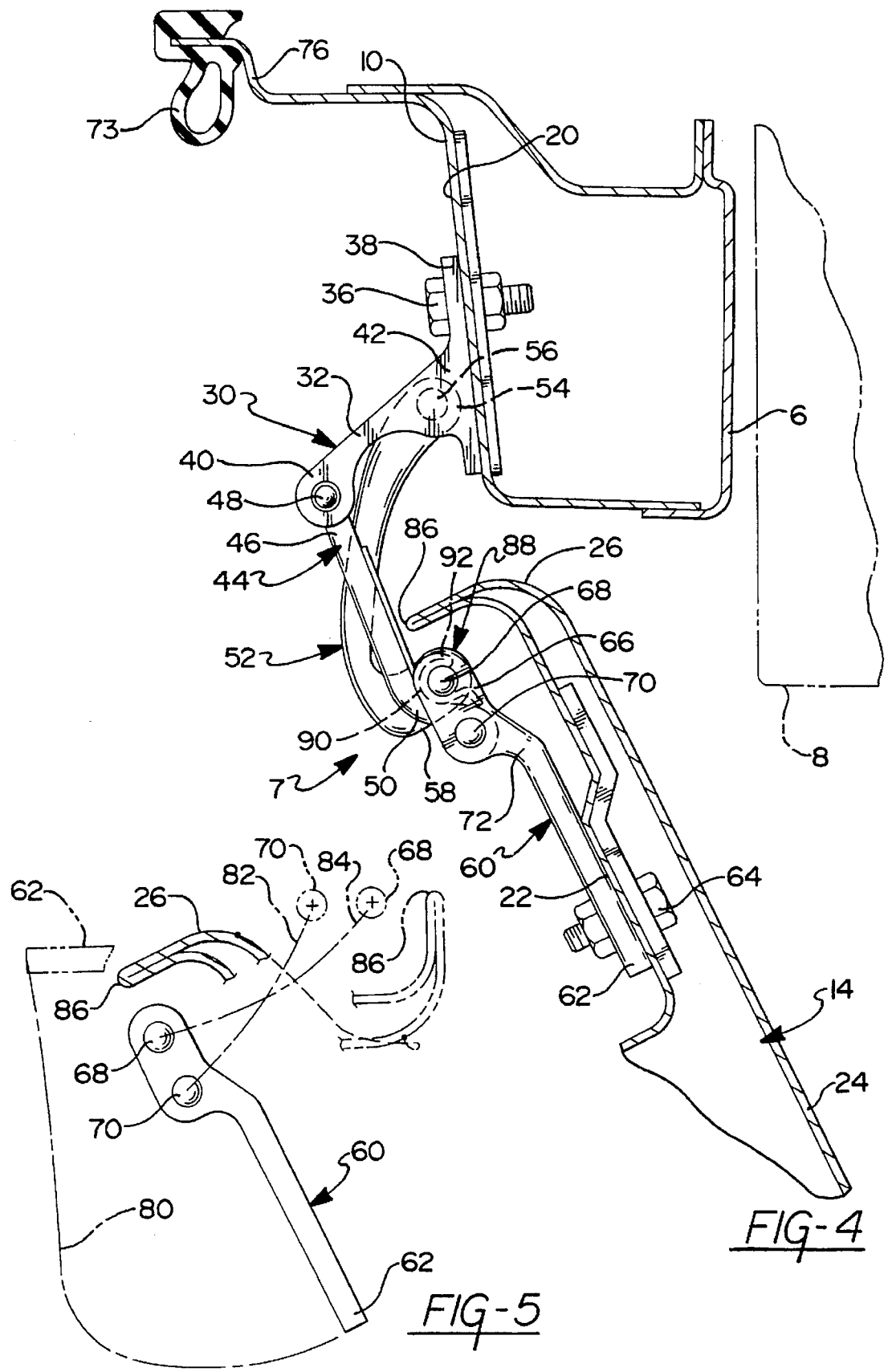

In its normally closed position, the door is sealed by an O-ring 73 extending from a flange 76 of the B-pillar 6. Referring additionally to FIG. 5, an extreme end 78 of the door 14 away from the hinge 7 moves along a path 80. The pin 70 moves along a path 82, which crisscrosses the path 84 taken by the pin 68. Therefore, the tip 86 of the door 14 will not contact the truck bed 8, although the gap 28 is fairly small.

Referring primarily to FIGS. 3 and 4, on a side of the weight-bearing second link 44 away from the second planar surface 22, there is a spring stop and spring 88. The spring stop 88 has a section 90 which limits the outward travel of the door by contact with the pin 68. Upon entry of the pin 68 into the stop section 90, the spring clasp or detent 92 will grab the pin 68, thereby holding the door in the open position. Therefore, in a situation where a physically challenged occupant attempts to remove a wheelchair from the cargo space 16 of the truck, the door 14 will remain open without further effort. It is important to note that this detent feature is provided without requiring an additional link and provides a cost and weight savings over previous detent mechanisms. All the weight of the door 14 is carried by the fourth link 60, the second link 44 and the first link 30. Therefore, the third link 52 may be a relatively small member which only functions to control the pivoting of the links as the door 14 is being opened.

Figure 6:
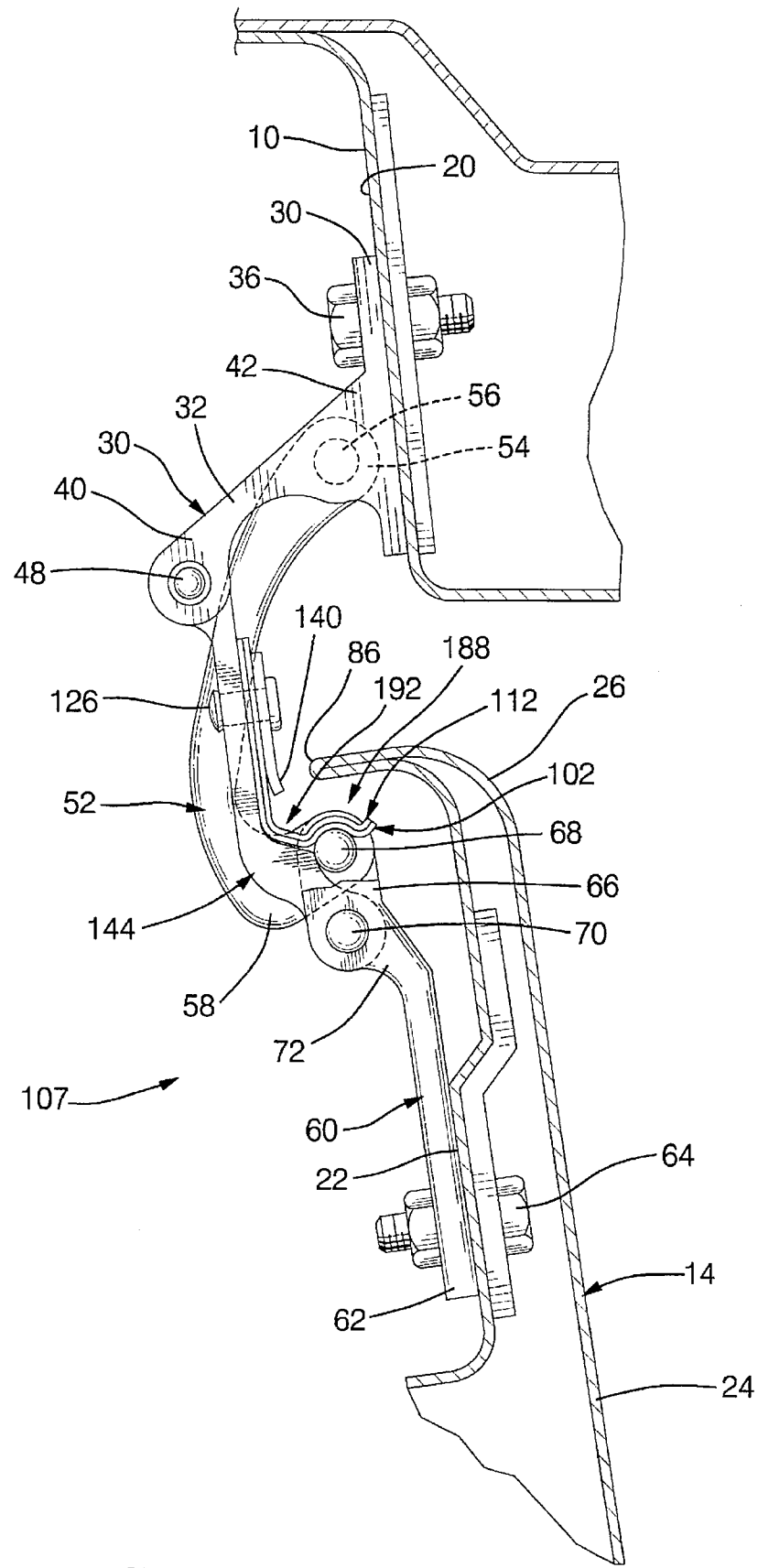
FIG. 6 is a view similar to that of FIG. 4 showing a vehicle door hinge arrangement according to the present invention.
Figure 7:
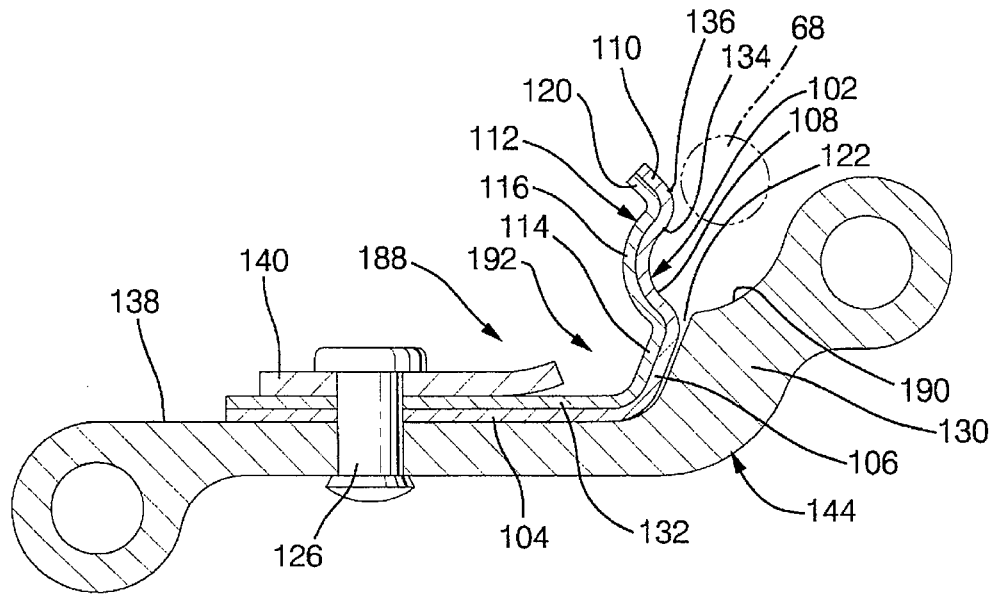
FIG. 7 is a view taken along line 7—7 of FIG. 8.
Figure 8:
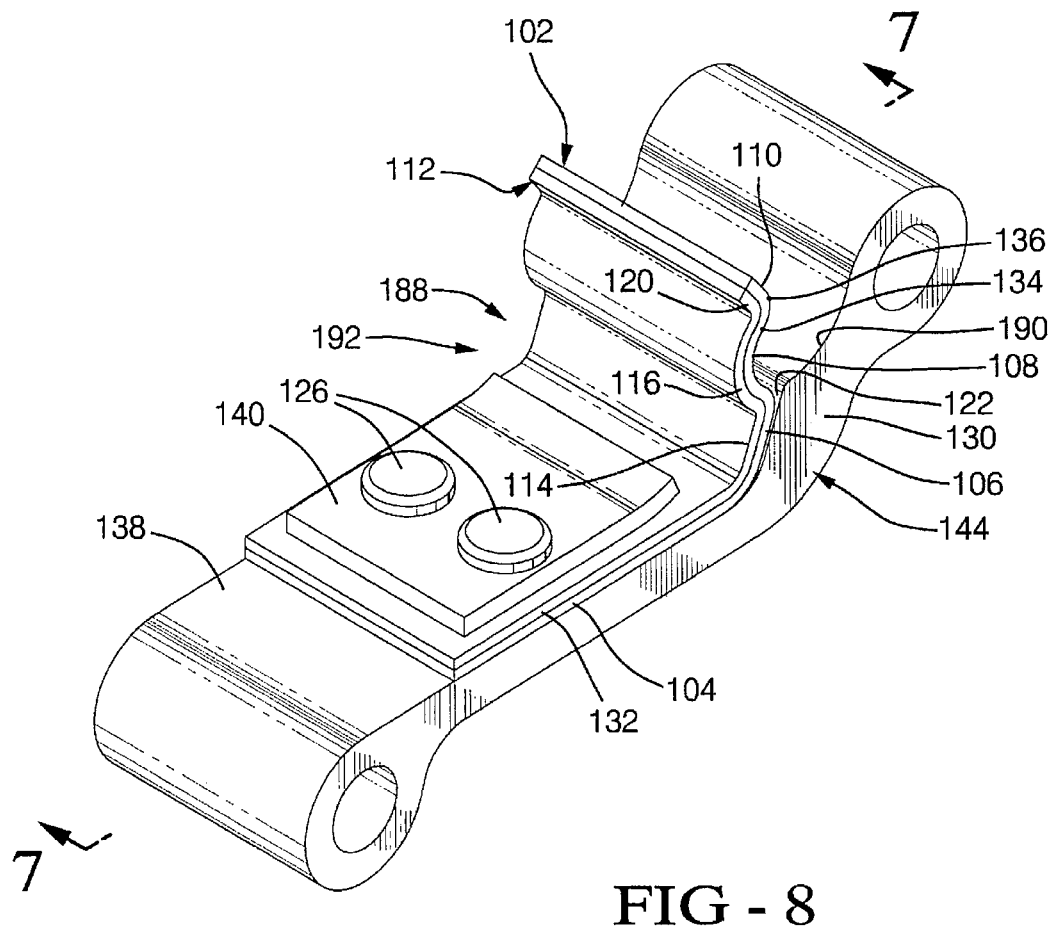
FIG. 8 is an enlarged perspective view of a link shown in FIG. 6 which has a spring stop attached thereto.

Referring additionally to FIGS. 6, 7 and 8, the vehicle door hinge arrangement 107 of the present invention is brought forth with those items which are identical to the hinge 7 being given the same reference numerals. The hinge 107 has a third link 144 with a spring stop 188. The spring stop 188 has a detent 192 with a primary leaf spring 102. Primary leaf spring 102 has a base 104. Extending from the base 104 is a primary leaf arm 106. Extending from the primary leaf arm 106 is a primary leaf hand 108. Joined to the primary leaf hand 108 is a primary leaf finger 110. The primary leaf hand 108 receives the pin 68 between itself and a section 190 located on the third link 144. The base 104 of the primary leaf is mounted on a side 138 of the third link 144.

A secondary leaf 112 has a base 132, an arm 114, a hand 116 and a finger 120 all adjacent the respective base, arm, hand and finger of the primary leaf 102. On a side of the secondary leaf 112 generally opposite the primary leaf base 104 is a reinforcement leaf 140. The reinforcement leaf is typically thicker than the primary and secondary leaves 102, 112. Additionally, the reinforcement leaf 140 has a chamfer on its end most adjacent to the arms 106 and 114 of the primary and secondary leafs. In the free state, a gap 122 exists between the primary leaf arm 106 and the arm 130 of the third link. Upon capture of the pin 68, the gap will be increased approximately one millimeter. When entering into the detented position as shown in FIG. 6 from the door 14 normally closed position, the pin 68 will typically first make contact with the finger 110 of the primary leaf, forcing the hands 108 and 116 of the primary and secondary leaves leftward as shown in FIG. 7 approximately two millimeters until the pin 68 hits section 190, whereupon the hand of the primary leaf will return approximately one millimeter to the right. Upon exiting the spring stop 188, the pin 68 will make contact with the primary leaf 102 approximately between contact points 134 and 136. Because the angle that pin 68 travels into the stop 188 is more shallow by hitting on the primary leaf finger 110, the force required for the pin 68 to enter is in the range of 22 Newtons with the force of exiting being in the range of 32 Newtons. This is highly desirable to prevent the inadvertent closure of the door due to a vehicle being parked on a hill or being impacted by the wind. The utilization of the multi-leaf design of the detent 192 greatly reduces stresses which could lead to fractures due to cyclical opening and closing of the door. The hinge arrangement 107 can be modified to increase the detenting and closure forces required for opening and closing the door by movement of the reinforcement leaf 140 toward the arm 130 of the third link 144. A five millimeter movement can result typically in a 30 percent increase in detenting force. Although not shown, if desired, the reinforcement link member 140 may be provided with slots, and a nut and bolt arrangement rather than a rivet may be substituted for the fasteners 126, allowing the closure and detenting force to be adjustable as desired.

While this invention has been described in terms of a preferred embodiment thereof, it will be appreciated that other forms could readily be adapted by one skilled in the art. Accordingly, the scope of this invention is to be considered limited only by the following claims.

The embodiments of the invention in which an exclusive property or privilege is claimed are defined as follows:

1. A vehicle door hinge arrangement for mounting a vehicle door to a vehicle opening, the hinge arrangement having at least first and second members, the first member having a first side and the second member being connected to a pin, the vehicle door hinge arrangement further including a spring stop mounted on the first member first side, the spring stop including:

a primary leaf with a base, an arm extending from the base, and the primary leaf having a hand extending from the arm for receiving the pin connected to the second member between the primary leaf and the first member;

a secondary leaf having a base, an arm and a hand adjacent the primary leaf on a side of the primary leaf opposite the first member; and a reinforcement leaf fixably connected to the primary and secondary leaves, the reinforcement leaf being adjacent the base of the secondary leaf.

2. A vehicle door hinge arrangement as described in claim 1 wherein the spring stop reinforcement leaf has a chamfer on an edge of the reinforcement leaf most adjacent to the arm of the secondary leaf.

3. A vehicle door hinge arrangement as described in claim 1 wherein the spring stop reinforcement leaf is thicker than the primary or secondary leaves.

4. A vehicle door hinge arrangement as described in claim 1 wherein the spring stop reinforcement leaf is fastened to the first member.

5. A vehicle door hinge arrangement as described in claim 1 wherein the spring stop primary leaf has at an end of the hand a finger and wherein upon entry the pin first contacts the finger and wherein the force required for the pin connected to the second member to enter the hand is less than the force required for the pin to leave the hand.

6. A concealed door hinge for a motor vehicle, the motor vehicle having a door opening including a pillar with a first planar surface and a door covering the opening, the door having a second planar surface, the hinge comprising:

a first weight-supporting link affixed to a base joined to the pillar first planar surface, the first link having a first end generally away from the base and a second end generally more adjacent to the base, the first and second ends being on a same side of the base as the first end;

a second weight-supporting link with first and second ends, the second link first end being pivotally connected to the first end of the first link;

a third link with first and second ends, the first end being pivotally connected with the first link second end;

a weight-supporting fourth link, the fourth link having a first end and a second extreme end, the first end being connected to the door second planar surface, the fourth link second end being pivotally connected to the second end of the third link, and the fourth link at a portion intermediate the first and second ends being pivotally connected to the second end of the second link, and the pivotal connection of the fourth link with the second and third links being on a same side of the second planar surface; and a spring stop mounted on a side of the second link farthest away from the door second planar surface limiting the opening of the door second planar surface away from the pillar first planar surface, the stop also detenting the second ends of the third and fourth links by grabbing and holding the third and fourth link second ends to retain the door in an open position, the spring stop links including a primary leaf with a base, the primary leaf also having an arm extending from the base, and the primary leaf having a hand extended from the arm for receiving between the primary leaf and a side of the second link;

a secondary leaf having a base, an arm and a hand adjacent the primary leaf on a side of the primary leaf opposite the third link; and a reinforcement leaf fixably connected to the primary and second leaves, the reinforcement leaf being adjacent the base of the secondary leaf.

\* \* \* \* \*